US011991041B2

(12) United States Patent
Snehashis et al.

(10) Patent No.: US 11,991,041 B2
(45) Date of Patent: May 21, 2024

(54) AUTONOMOUS TERRAFORMING ON CLOUD INFRASTRUCTURES

(71) Applicant: Oracle International Corporation, Redwood Shores, CA (US)

(72) Inventors: Soumya Snehashis, San Lorenzo, CA (US); Swayam Sidhhant Parida, Stanford, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/730,656

(22) Filed: Dec. 30, 2019

(65) Prior Publication Data

US 2021/0203549 A1 Jul. 1, 2021

(51) Int. Cl.
| | |
|---|---|
| H04L 41/0806 | (2022.01) |
| H04L 41/0893 | (2022.01) |
| H04L 41/5009 | (2022.01) |
| H04L 43/0805 | (2022.01) |
| H04L 67/1001 | (2022.01) |

(52) U.S. Cl.
CPC ...... *H04L 41/0806* (2013.01); *H04L 41/0893* (2013.01); *H04L 41/5009* (2013.01); *H04L 43/0805* (2013.01); *H04L 67/1001* (2022.05)

(58) Field of Classification Search
CPC ............. H04L 41/0806; H04L 41/0893; H04L 41/5009; H04L 43/0805; H04L 67/1002
USPC ....................................................... 709/222
See application file for complete search history.

(56) References Cited

U.S. PATENT DOCUMENTS

| | | | |
|---|---|---|---|
| 9,621,428 B1 | 4/2017 | Lev et al. | |
| 2014/0189155 A1* | 7/2014 | Morris | H04L 45/02 709/238 |
| 2014/0282434 A1* | 9/2014 | Eilam | G06F 11/3688 717/124 |

(Continued)

FOREIGN PATENT DOCUMENTS

EP  3611619 A1 * 2/2020 ............... G06F 8/60

OTHER PUBLICATIONS

International Application No. PCT/US2020/067083, International Search Report and Written Opinion dated Mar. 26, 2021, 14 pages.

(Continued)

*Primary Examiner* — Cheikh T Ndiaye
*Assistant Examiner* — Ayele F Woldemariam
(74) *Attorney, Agent, or Firm* — Kilpatrick Townsend & Stockton LLP

(57) ABSTRACT

A process for defining a cloud service in an Infrastructure as Code (IaC) tool is designed to dynamically determine numbers of clusters, availability domains, compute nodes, and/or load balancers at run time. These values are then used to determine a number of subnet levels required for a classless inter-domain routing (CIDR) slicing operation to generate subnets for each of the compute nodes and load balancer nodes in the service. Because IaC languages do not provide nested loop control constructs, labels for each of the subnets can be generated and assigned using a Cartesian product of label elements. These labels can be modified by a count variable that is incremented each time a resource is duplicated in the script to simulate the effect of a nested loop structure.

20 Claims, 17 Drawing Sheets

(56) References Cited

U.S. PATENT DOCUMENTS

| | | | |
|---|---|---|---|
| 2016/0081668 A1* | 3/2016 | Chirikjian | A61B 90/361 |
| | | | 600/437 |
| 2016/0197880 A1* | 7/2016 | Korman | H04L 41/0896 |
| | | | 709/226 |
| 2017/0289060 A1* | 10/2017 | Aftab | H04L 41/5054 |
| 2019/0052542 A1* | 2/2019 | Passante | G06F 8/427 |
| 2020/0329464 A1* | 10/2020 | Madapoosi Sampath | |
| | | | H04L 41/12 |
| 2021/0124624 A1* | 4/2021 | Jeong | G06F 9/5044 |

OTHER PUBLICATIONS

Application No. PCT/US2020/067083, International Preliminary Report on Patentability, dated Jul. 14, 2022, 11 pages.

* cited by examiner

| Index (index/a, index mod a) | Cartesian Product | | |
|---|---|---|---|
| | AD-1 | AD-2 | AD-3 |
| Production | 0 (0,0) | 1 (0,1) | 2 (0,2) |
| Development | 3 (1,0) | 4 (1,1) | 5 (1,2) |
| Staging | 6 (2,0) | 7 (2,1) | 8 (2,2) |
| QA | 9 (3,0) | 10 (3,1) | 11 (3,2) |

FIG. 5

AUTONOMOUS TERRAFORMING ON CLOUD INFRASTRUCTURES

BACKGROUND

Cloud computing can provide both an Infrastructure as a Service (IaaS) and a Platform as a Service (PaaS) to allow customers to securely run mission-critical enterprise applications and database workloads on a shared infrastructure. These cloud computing infrastructures may host various applications, and the industry is rapidly turning towards micro-service based frameworks for providing cloud-based technologies. For example, micro-service projects may be hosted in clusters of containerized projects, such as the Kubernetes Engine, all of which are hosted and accessible through a shared cloud infrastructure that guarantees data security between tenants.

When a customer begins the process of moving their computing infrastructure to the cloud, the cloud infrastructure can create a new tenancy for that customer. Once the tenancy is created, the customer may use a console web application to create the required environment building blocks to achieve the desired functionality of any microservice project hosted in the cloud environment. In existing technologies, new tenants can create these building blocks manually by selecting existing technologies and adding them to their cloud footprint. Alternatively, some systems allow the tenant to organize the building blocks of their cloud footprint using an automated scripting technology. Automated scripts may be written in any "infrastructure as code" software tool that allows users to define and provision a data center infrastructure using a high-level configuration language. Scripts written these languages can be executed to generate building blocks for a cloud footprint, which may greatly simplify the provisioning process. However, because these scripting languages are meant to represent instances of cloud hardware/software, they typically do not provide features and code constructs that can be used to write robust, reusable code across many different applications.

BRIEF SUMMARY

Infrastructure as Code (IaC) tools are useful for declaring resources to be provisioned as part of a service in a cloud infrastructure. However, IaC tools use declarative languages that specify resources to be provisioned rather than imperative languages that execute a set of commands and control structures. Therefore, IaC scripts may define specific resources and structures to be provisioned for a specific service, and scripts are not easily reused for different services or provisioning tasks without significant changes to the script.

The embodiments described herein present processes for defining a cloud service in an IaC tool is designed to dynamically determine numbers of clusters, availability domains, compute nodes, and/or load balancers at run time. These values are then used to determine a number of subnet levels required for a classless inter-domain routing (CIDR) slicing operation to generate subnets for each of the compute nodes and load balancer nodes in the service. Because IaC languages do not provide nested loop control constructs, labels for each of the subnets can be generated and assigned using a Cartesian product of label elements. These labels can be modified by a count variable that is incremented each time a resource is duplicated in the script to simulate the effect of a nested loop structure.

The script can receive or determine a baseline set of parameters that may change with each service being provisioned. These parameters can be received or determined at runtime as the script is executed, and the parameters may include a number of clusters to be provisioned as part of a service, a number of availability domains in each cluster, a number of compute nodes in each availability domain, a number of load balancers in each of the clusters, and so forth. The script can then determine a number of CIDR levels that will guarantee an adequate number of subnets for the compute nodes and/or load balancer nodes to be provisioned, with extra subnets providing room for future expansions. Instead of calculating and hard-coding these values into the script for each different provisioning tasks, these values can be provided and calculated at runtime such that the scripts can be reused for any similar provisioning task without modification.

Assigning the calculated subnets and labels to each of the declared resources would normally require nested loop control structures in the code. However, as IaC tools typically do not provide such structures, the scripts can simulate the operation of nested loops by calculating Cartesian products of vectors that include the components for each subnet label. For example, subnet labels generated using availability domains and cluster labels can be generated by cross-multiplying these label vectors together to generate a list of all combinations of availability domains and clusters. These labels can be further modified to include a counter value that is used to reproduce the declared resource in the script.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5 illustrates how the Cartesian product can be calculated using modular arithmetic, according to some embodiments.

DETAILED DESCRIPTION

Figure 1:
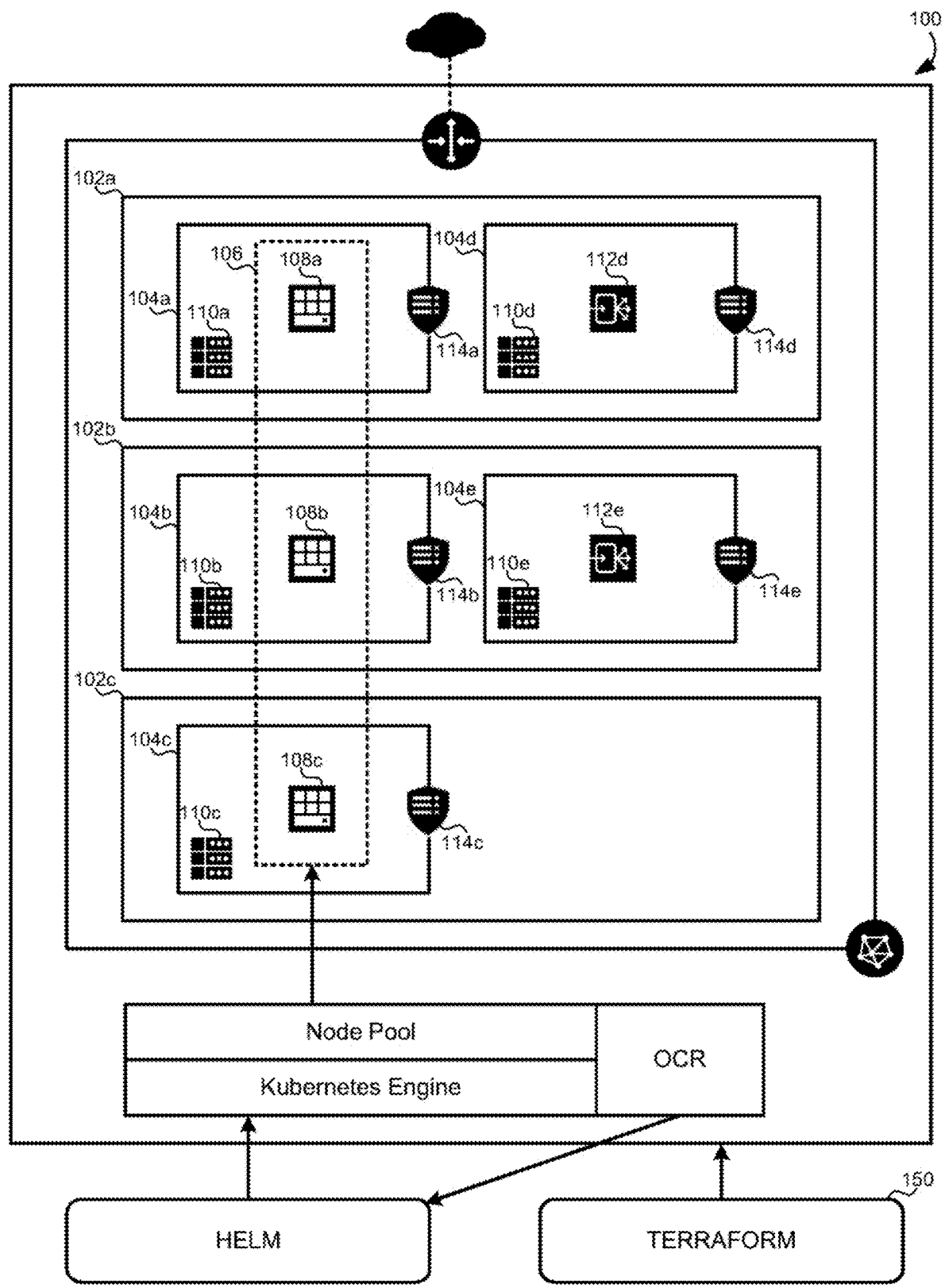
FIG. 1 illustrates an architectural design of a structural tenancy and a cloud environment, according to some embodiments.

Cloud computing environments may include hundreds of individual building blocks, each of which represents a unique hardware and/or software technology. Tenants of cloud computing infrastructures may wish to design very complex cloud-based applications that can handle a large amount of web traffic and store large amount of information for millions of individual users. These cloud-based applications may represent an enormous complexity of interactions between different cloud technologies. However, to simplify the process of designing and provisioning complex applications, many modern cloud-based applications may be designed as micro-service applications. Micro-service applications use individual, simple micro-services as the building blocks for complex technologies. When designing a large-scale application, a tenant may piece together many individual micro-service building blocks to form the overall functionality of the application. This process can simplify large complex design tasks such that they can be assembled by simple building blocks.

When a cloud-based application is designed, the individual hardware/software components of the design may be provisioned in the cloud environment, and the application may be made available to users. Cloud provisioning is the allocation of a cloud provider's resources and services to a particular tenant. This disclosure focuses on the ability of the tenant or provider to automatically provision applications in a cloud service. For example, in this model the tenant may select and assemble the building blocks of their cloud application through a web interface or portal. This provisioning model gives the user direct control over how an application is built and organized in the cloud environment. This typically alleviates the need for interactions between the cloud provider support services and the customer. Instead, the customer can provision the cloud application on their own, and the cloud environment can then automatically receive the instructions from the customer and provision the required resources without the need for extensive administrative interaction with the process.

Despite the use of micro-services and simplified building blocks during the provisioning process, the complexity of some applications may still be very difficult for users. Therefore, some embodiments may use scripting languages to implement "Infrastructure as Code" (IaC) environments for managing and provisioning cloud applications. IaC languages provision computer data centers through machine-readable definition files in the place of or in addition to physical hardware configuration or interactive configuration tools. IaC languages can manage both bare-metal servers as well as virtual machines associated with configuration resources. This allows users to model infrastructure using code, which in turn gives them the ability to design, implement, and deploy application infrastructures using software best practices and reusable coding techniques. IaC can be ingested by the cloud computing architecture, which can then assemble the building blocks declared by the code and arrange the building blocks in a connected fashion based on the code definitions.

Despite the obvious advantages that accompany using IaC technologies, there are various limitations that are inherent to the language. Because IaC languages are meant to represent actual pieces of the cloud infrastructure and their interconnectivity, the languages are typically designed such that they lack the control structures that are common in true software programming languages. These inherent limitations in the IaC languages make simple scripts difficult to scale across multiple infrastructures. These languages are not designed to adapt to new changes that may be demanded by an existing and growing infrastructure. For example, Classless Inter-Domain Routing (CIDR) slicing required values that are pre-calculated manually and hardcoded into the scripts when building the cloud infrastructure. Such an approach required human intervention to recalculate the changes, change the code, and re-execute the script before the code can be reused for a new application. This process is time-consuming, requires human intervention, and increases the chances of injecting defects into the provisioning process. In contrast to the new algorithm described in this disclosure, other techniques for making IaC languages more generic and reusable each had drawbacks that limited their effectiveness or reusability. For example, most existing solutions solve this problem by simply writing redundant code.

The embodiments described herein illustrate new coding techniques that can be used to overcome the existing limitations of IaC languages. For example, a new algorithm for CIDR-slicing has been developed using multiple iterators that can generate a complete infrastructure blueprint of any size that does not require any manual calculations or changes to the generic code. Any change in input variables automatically triggers a recalculation using the new algorithm, and the script may trigger a realignment of the cloud infrastructure as needed. This type of programming and execution was not possible through the previous industry solutions to this technical problem. This solution uses existing IaC language capabilities with new coding techniques to augment the language capabilities beyond what was originally intended.

FIG. 1 illustrates an architectural design of a structural tenancy and a cloud environment, according to some embodiments. The architecture 100 provides an example of an architecture that can be specified using an IaC language. When a script written in the IaC language is received and executed by the cloud infrastructure, the architecture 100 can be provisioned according to the infrastructure defined by the IaC language script. Because the IaC script is a formal language that can be easily interpreted and matched to building block technologies in the cloud infrastructure, the architecture 100 can be provisioned automatically by the cloud infrastructure without significant human involvement. The IaC script may lay out individual technologies as an architecture, and the cloud infrastructure can treat the IaC script as a blueprint for provisioning each of the technologies declared in the script.

The architecture 100 in FIG. 1 is provided merely by way of example and is not meant to be limiting. The components in the architecture 100 may provide examples of technology building blocks that can be declared by an IaC script. Although a discrete number of each technology is illustrated in FIG. 1, it should be understood that the algorithm described below allows each of the technologies in FIG. 1 to be scaled in any number and in any combination without limitation. The architecture 100 provides a description of how specific technologies (e.g., availability domains, load balancers, clusters, worker subnets, etc.) can be scaled by the embodiments described herein.

The architecture 100 includes a plurality of availability domains 102. Each of the availability domains 102 may include a portion of the micro-services that build the overall application. The availability domains 102 may include redundant services such that the availability may be maintained if one of the availability domains 102 becomes unavailable. The availability domains 102 may be isolated from each other, fault-tolerant, and very unlikely to fail simultaneously. Additionally, the availability domains 102 may correspond to different assemblies of physical hardware that are located in different geographic locations, such as different regions. Alternatively, availability domains within the same region may be connected to each other by low latency, high bandwidth networks in order to build replicated systems in multiple regions for both high-availability and disaster recovery.

A number of different technologies may be part of each of the availability domains 102. For example, each of the availability domains 102 may include one or more subnets 104. Each of the subnets 104 may be assigned a specific subnet address. Determining the precise number of subnets 104 may be determined in order to properly slice a top-level network address. This procedure known as CIDR slicing is described in greater detail below. Each of the subnets 104 may use the assigned subnet address for inbound/outbound network access and communication between the subnets 104.

The subnets 104 may host the resources found in each cluster. Although many different resources may be hosted within the subnets 104, two particular resources are illustrated in FIG. 1 as examples. Some of the subnets 104 may include a compute node 108. The compute node 108 may also be referred to as a worker node. The compute node 108 performs the actions associated with the corresponding worker subnets. For example, the network address for worker subnet 104a may be used to call a service that is performed by compute node 108a. Some of the compute nodes 108 in the cluster may be designated as a node pool 106. Subnets 104 that included compute nodes 108 may be referred to as worker subnets.

In addition to holding compute nodes 108, the subnets 104 may alternatively include load balancers 112. The load balancers 112 may receive and distribute traffic among the different worker subnets in each of the availability domains 102. These subnets may be referred to as load-balancer subnets.

Each of the subnets 104 may also be associated with a security node 114. The security nodes 114 may manage a security policy for each of the worker subnets 104. In some embodiments, the security nodes 114 may use an access list 110 to govern systems and/or users that may access the corresponding security nodes 114.

Finally, the architecture 100 illustrated in FIG. 1 may be contained in a single cluster. Multiple clusters may be formed that are identical to that illustrated in FIG. 1 in order to implement a service with high-availability.

The architecture 100 may be provisioned by providing an IaC script to the cloud infrastructure. The structure may then interpret the technologies listed in the script, and provision those technologies automatically. Any IaC language may be use, such as Pulumi, Chef, Otter, Puppet SaltStack, CFEngine, DSC, Paco, and others. As an example, the embodiments described herein may use the Terraform tool 150 provided by Hashicorp. Each of these tools may use a declarative language to define the various technologies that should be provisioned as part of the cloud infrastructure. As declarative languages, these IaC tools generally do not support advanced control structures that may be used in other languages. For example, the Terraform tool 150 does not support any type of looping mechanism. Instead, a resource may be instantiated a defined number of times using the count meta-argument for a resource. This prevents the tool from using any form of nested loop that may be useful for making assignments or calculations using multiple variables. Additionally, the Terraform tool does not provide a straightforward method of performing CIDR slicing for a variable number of subnets that are not known at the time the code is written.

Figure 2:
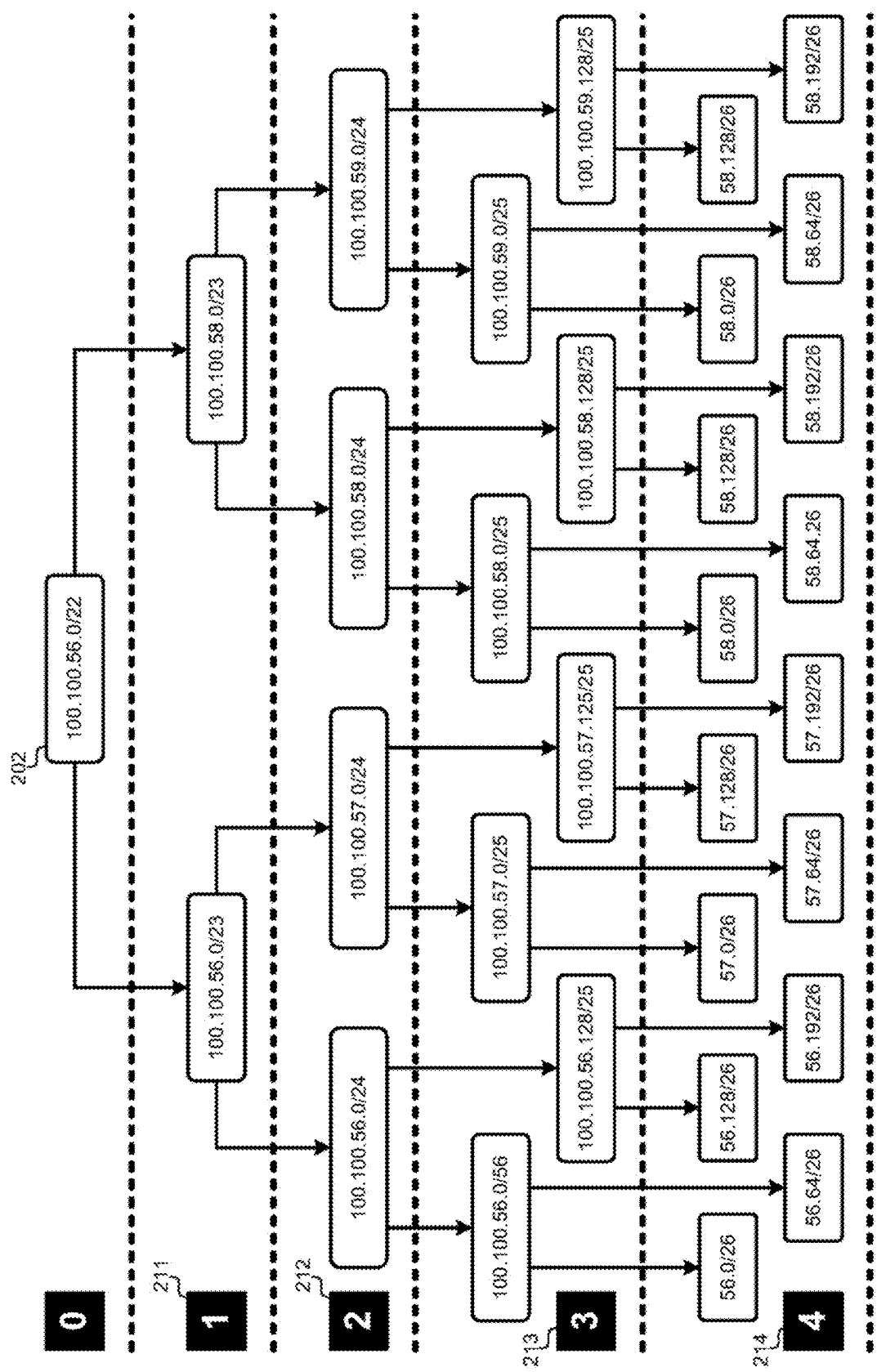
FIG. 2 illustrates how a single network address can be "sliced" into a plurality of different networks, according to some embodiments.

FIG. 2 illustrates how a single network address 202 can be "sliced" into a plurality of different networks, according to some embodiments. CIDR slicing uses address aggregation to turn a single network address into a plurality of addressable networks. As described above in relation to FIG. 1, each of the subnets 104 may require their own network address that exists as a subnet of the top-level network address 202. The concept of CIDR slicing subdivides the top-level network address 202 into a number of subnetworks based on the number of networks that are needed. Prior to this disclosure, deriving a plurality of subnet addresses from the top-level network address 202 was a static operation. In other words, the user would determine the number of subnets required, and then divide the top-level network address 202 accordingly. These values were hard-coded into the Terraform script when the script was written and the service was designed for provisioning in the cloud infrastructure. Although future scripts could be based on existing scripts, the hardcoded values always needed to be changed in new scripts in order to expand or contract the size of the number of subnets. This required human intervention that was error-prone and reduced the overall usability of the code. It also increased the number of scripts that needed to be saved, as each script could only be used for a corresponding particular provisioning project.

The embodiments described herein solve these and other technical problems by using a new algorithm and method that conceptualizes the CIDR slicing as a binary tree that can be dynamically sized up and/or down as the user changes the number of availability domains, clusters, worker subnets, and/or load balancers to be provisioned. FIG. 2 illustrates how the top-level network address 202 can be sliced into a variable number of subnets based on a level designation. For example, if the service being provisioned requires two subnets, then the level 1 (211) slicing operation may be performed. If up to four subnets are to be used, then a level 2 (212) slicing operation may be performed, and so forth.

Various levels may be used based on the minimum number of subnets required. The levels 211, 212, 213, 214 illustrated in FIG. 2 are based on a base-2 exponential. For example, level 3 (213) corresponds to $2^3=8$ subnets. Similarly, level 4 (214) corresponds to $2^4=16$ subnets. To determine the level number needed for the slicing operation, the Terraform script can determine the minimum number of subnets required and then select a level providing at least that many subnets. For example, if six subnets are required for a service being provisioned, the script can dynamically determine that a level 3 (213) slicing operation on the top-level network address 202 should take place. This guarantees that the required number of subnets will be provided, along with additional subnets that may be used for future expansion.

The embodiments described herein allow the script to dynamically determine the level for the CIDR slicing operation when the script is executed. As described in detail below, this does not require any hardcoded values to be included in the script. Rather, the script can use a desired number of clusters, availability domains, worker subnets, load balancers, etc., to calculate at runtime the level required for the slicing operation. Additionally, as a project scales up and down, the subnet addresses can be recalculated by simply changing the number of, for example, availability domains in the project. The script can then automatically recalculate the number of levels to be used in the slicing operation.

Not only do these techniques make the code scalable over the lifetime of a single project, but they also allow the code to be reused for future projects of any scale. The code may accept values that are specified by users during the service design process. For example, users commonly specify a number of load balancers, or a number of availability domains that should be part of their project. However, users do not specify the level of the CIDR slicing operation that should be used to generate the proper number of subnet addresses. This is a low-level detail that would not likely be understood by the user. The subnet addresses would instead have to be hardcoded into the Terraform script, making the code unusable for any projects without the same specific architecture. The embodiments described herein allow users to dynamically change inputs to the script and thereby move up and down the different levels 211, 212, 213, 214 illustrated in FIG. 2. In short, these embodiments achieve a form of auto-CIDR slicing that was previously unavailable.

Figure 3A:
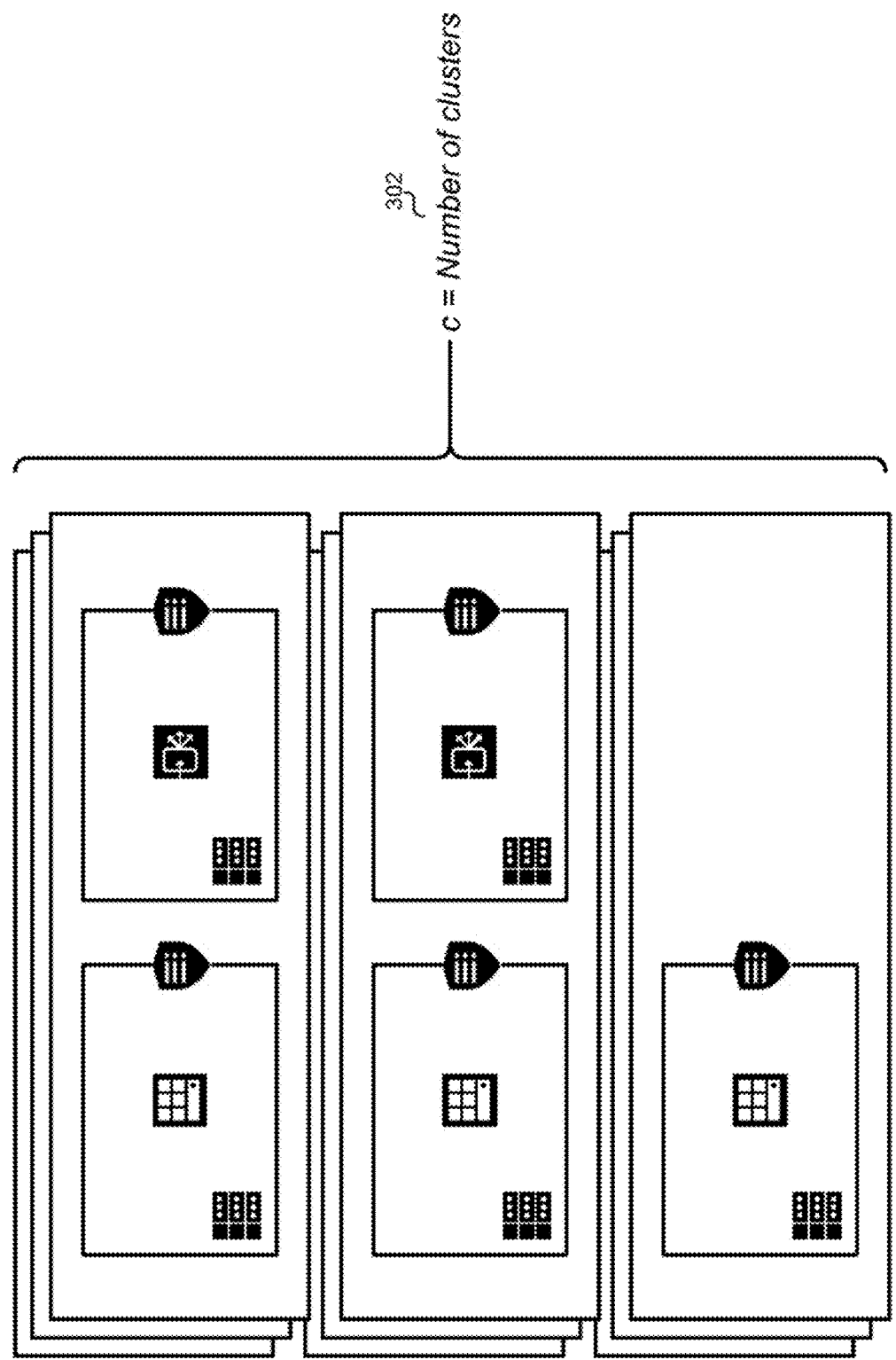
FIG. 3A illustrates a first input specifying a number of clusters that may be determined and/or received by the algorithm, according to some embodiments.

The following figures walk through different inputs that may be determined and/or provided by the script. Then, this disclosure will describe an algorithm for determining a slicing level and for automatically generating corresponding subnets. FIG. 3A illustrates a first input specifying a number of clusters 302 that may be determined and/or received by the algorithm, according to some embodiments. As described above in FIG. 1, each cluster 302 may be comprised of one or more availability domains, and each of the availability domains may include any number of worker subnets and/or load balancers. The number of clusters 302 may be referred to herein using the variable c as a shorthand in the equations described below. The number of clusters 302 may be specified explicitly by a user as an input to the script. Alternatively or additionally, the number of clusters 302 may also be determined by other values and/or operations provided by the user. For example, the user may select a predetermined configuration from a plurality of available configurations for their project. These configurations may correspond to a predetermined number of clusters, and the script may translate the configuration into the number of clusters 302 using a lookup table, a database, and/or the like.

Figure 3B:
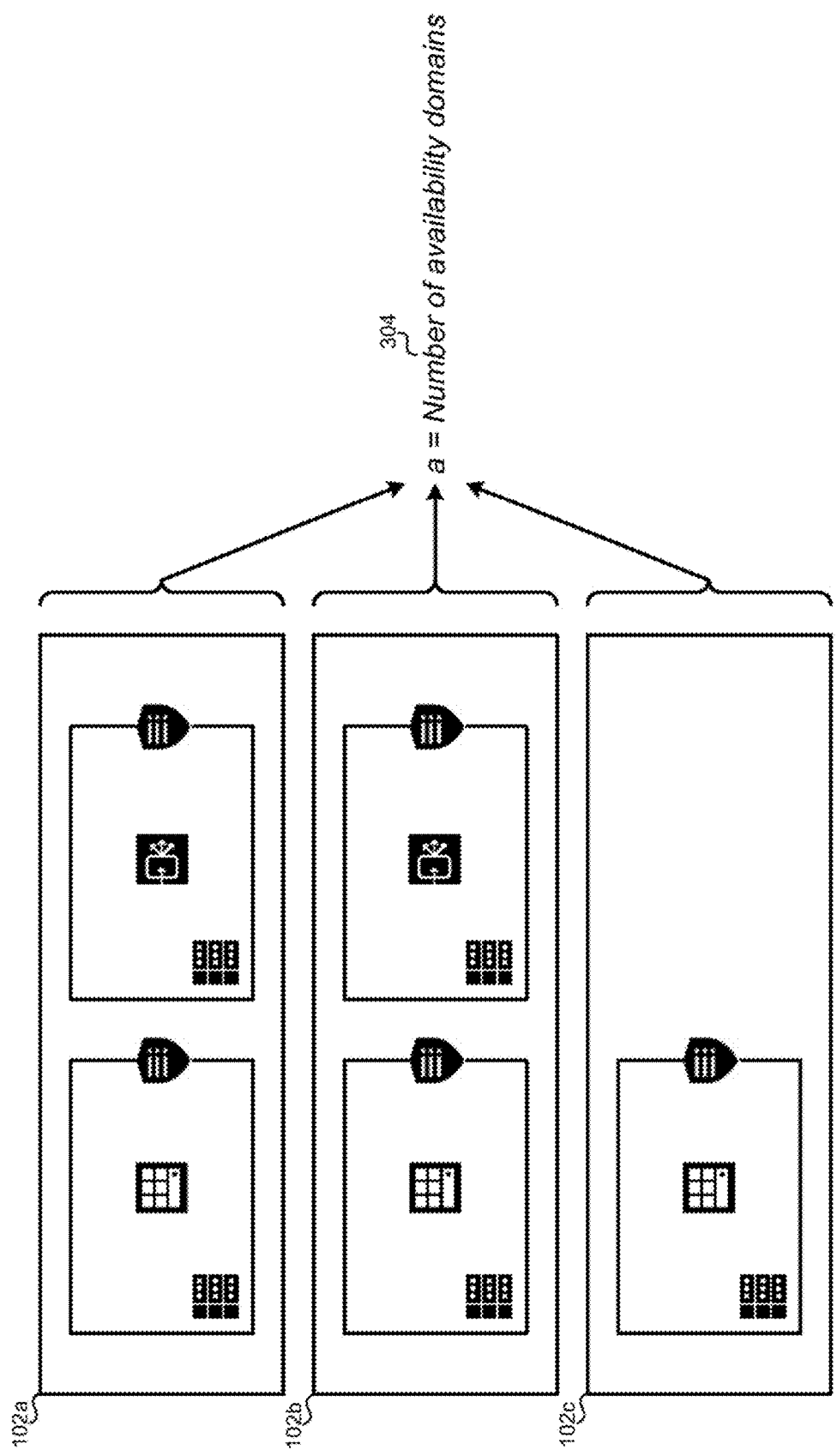
FIG. 3B illustrates a second input specifying a number of availability domains that may be determined and/or received by the algorithm, according to some embodiments.

FIG. 3B illustrates a second input specifying a number of availability domains 304 that may be determined and/or received by the algorithm, according to some embodiments. As described above in FIG. 1, each of the availability domains 102 may be provided to provide high-availability for the service being provisioned. Functionality may be duplicated across the availability domains 102 such that if one availability domain 202b becomes unavailable, the service may still be provided through the other availability domains 202a, 202c. The number of availability domains 304 may be represented using the variable a as a shorthand in the equations described below. The number of availability domains 304 may be provided as an input to the script by the user. For example, the user may specify three availability domains 102 as an input. Alternatively, the user may select a level of availability (e.g., high, medium, low) for the service. The script may then look up or calculate a number of availability domains 102 corresponding to the level of availability chosen for that particular project. Note that the number of availability domains 304 need not specify the total number of availability domains in the entire project. Instead, the number of availability domains 304 may instead be provided on a per-cluster basis. In other words, the number availability domains 304 may represent the number of availability domains in each cluster.

For example, a configuration may be selected by a user from a plurality of predefined configurations. these configurations may be presented to the user as part of a runtime execution of the Terraform script, such that values may be input at runtime. Each configuration may be associated with a service level agreement (SLA) that specifies a level of availability required for the service. The system may derive a number of availability domains that may be needed to meet the level of availability required in the SLA. Note that this same procedure may be used for determining the number of clusters, determining the number of compute nodes, and/or determining the number of load balancers.

In some embodiments, these values may be received dynamically at runtime as inputs to the script. This allows the script to be reused to define different services having different characteristics that would require a different number of clusters, availability domains, compute nodes, and/or load balancers. For example, after using the script to provision a first service, a second, different service may be provisioned using the same script. By providing different numbers of clusters, availability domains, compute nodes, and/or load balancers as inputs to the script at runtime, different services may be provisioned that have different subnet levels, different top-level network addresses, and/or otherwise different topologies. This allows the same script to be reused to provision different services without requiring the script to be edited. Previously, a different script would be required for each service being provisioned if any of these parameters were different.

In some embodiments, these values may be changed dynamically after a provisioning process has taken place. For example, the script may be executed to provision a service by receiving runtime values. After the services provision, the customer may wish to change the level of availability, the cluster locations/numbers, and/or any other parameter. Instead of generating a new script, the same script can be executed a second time and changes to the inputs can be received to recalculate the number of subnet levels and to regenerate the subnets based on the new numbers of availability domains, clusters, compute nodes, load balancers, and so forth.

Figure 3C:
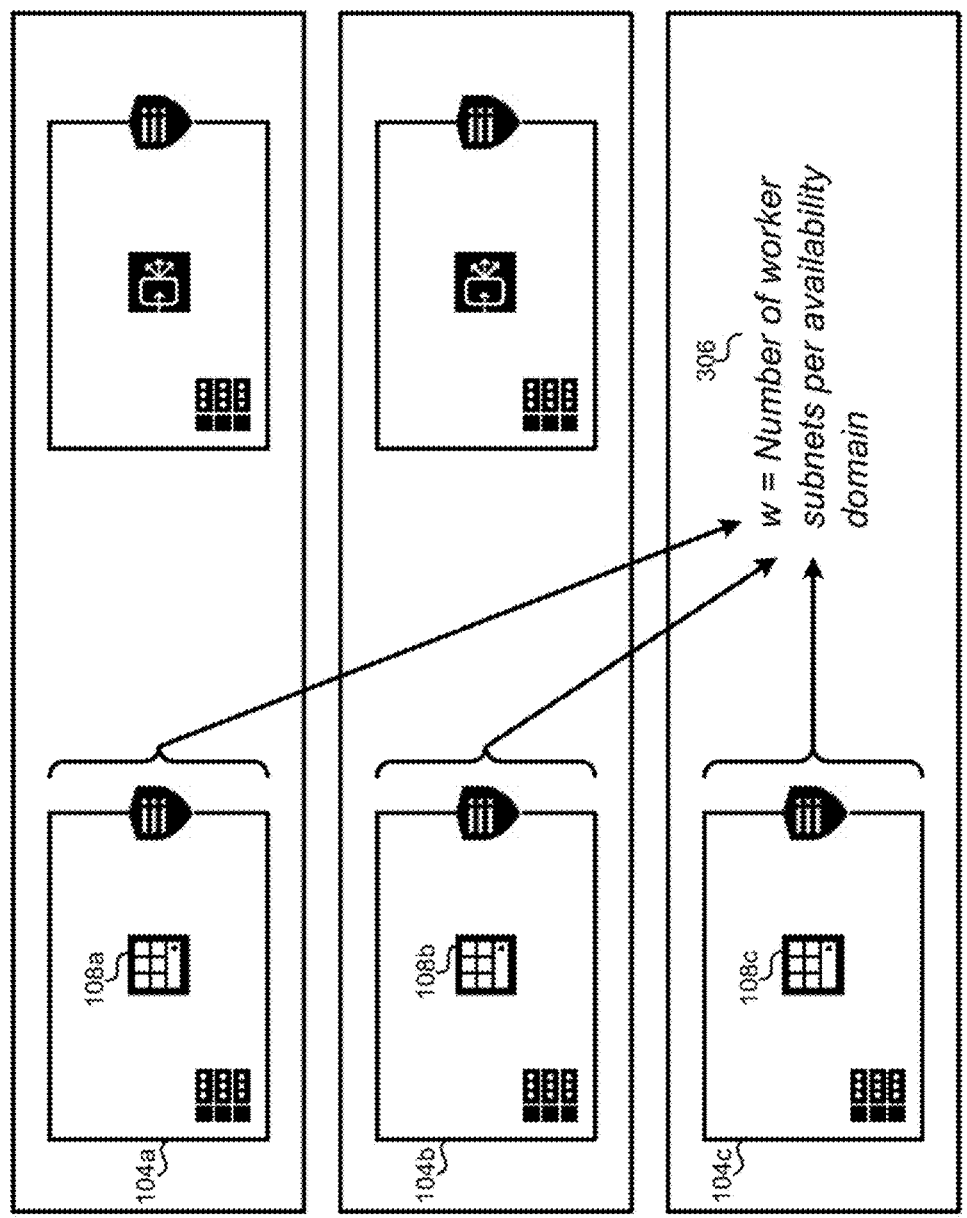
FIG. 3C illustrates a third input specifying a number of worker subnets that may be determined and/or received by the algorithm, according to some embodiments.

FIG. 3C illustrates a third input specifying a number of worker subnets 104 that may be determined and/or received by the algorithm, according to some embodiments. As described above in FIG. 1, each of the worker subnets 104 may be assigned one of the subnet addresses from the CIDR slicing operation described in FIG. 2. Each worker subnet 104 may include a compute node 108. The number of worker subnets 306 may be represented using the variable w as a shorthand in the equations described below. As was the case for the number of availability domains 304, the number of worker subnets 306 may be provided on a per-availability domain basis. In other words, the number of worker subnets 306 may represent the number of worker subnets in each availability domain. For example, the number of worker subnets 306 per availability domain in FIG. 3C is one worker subnet. The number of worker subnets 306 may be received and/or determined by the Terraform script. For example, a user may provide the number of worker subnets 306 per availability domain as an input to the script. Alternatively, the user may select a function to be performed in an availability domain, and the script may automatically determine which worker subnets should be included in the design, which thereby may determine the number of worker subnets 306.

Figure 3D:
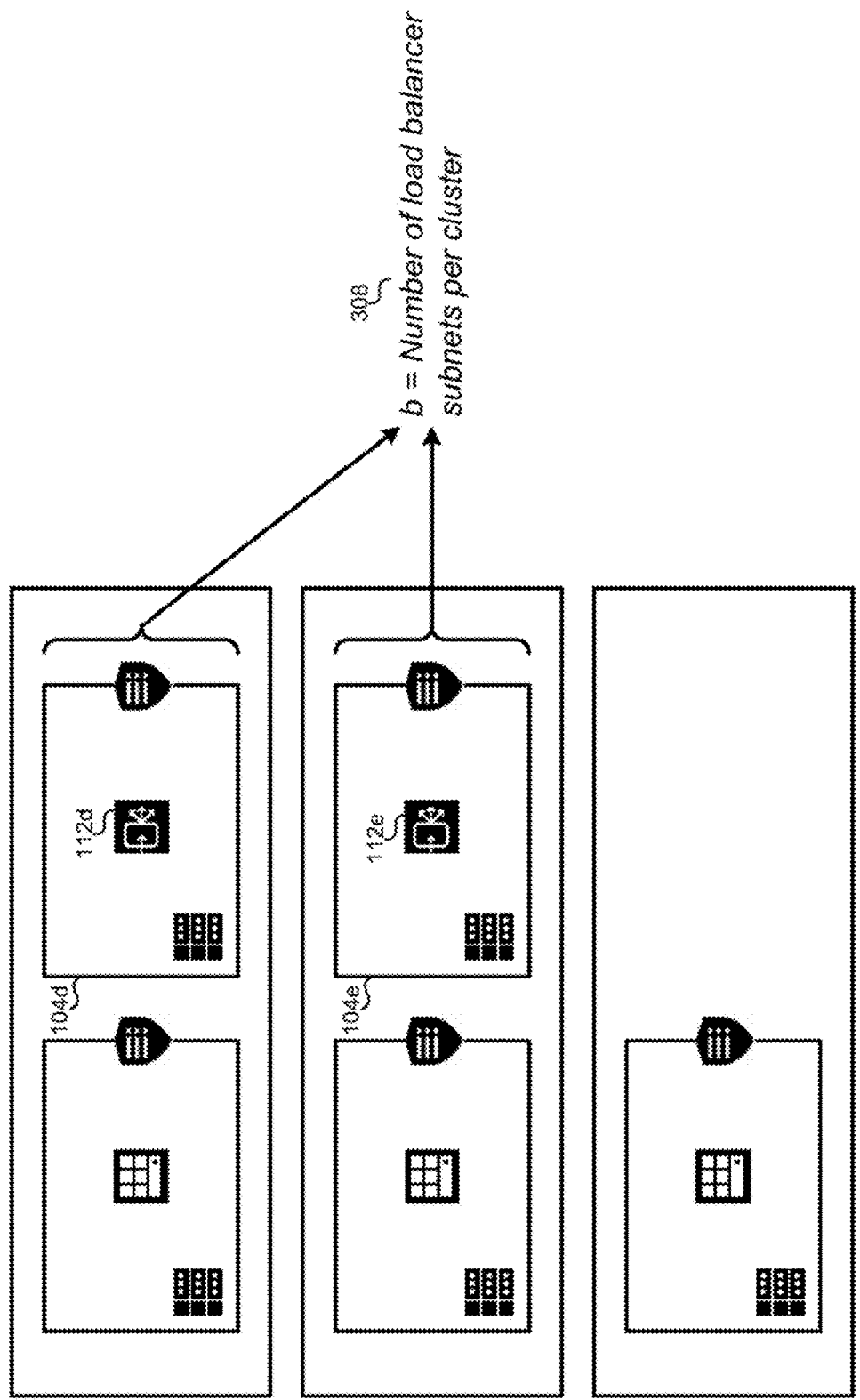
FIG. 3D illustrates a fourth input specifying a number of load balancer subnets that may be determined and/or received by the algorithm, according to some embodiments.

FIG. 3D illustrates a fourth input specifying a number of load balancer subnets 308 that may be determined and/or received by the algorithm, according to some embodiments. As described above in FIG. 1, each of the load balancer subnets may include a load balancer 112 that manages and routes traffic to the worker subnets. The number of load balancer subnets may be represented using the variable b as a shorthand in the equations described below. This number may specify the number of load balancer subnets per cluster. Typically, users do not need to organize load balancer subnets into particular availability domains, and they will instead simply specify a total number of load balancers needed in each cluster. This number may be specified as an input to the script. Alternatively, the number of load balancer subnets 308 may be determined by the script at runtime. For example, a user may specify one or more predefined configurations for the service, and the script may derive the number of needed load balancers from those configurations.

Based on these inputs, the following algorithm may be used for determining a total number of subnets to be used for the service being provisioned. In one step, the algorithm may calculate a total number of worker subnets to be provisioned. The total number of worker subnets may be calculated based on the total number of clusters 302, the total number of availability domains per cluster 304, and the total number of worker subnets per availability domain 306. For example, the total number of worker subnets may be calculated using the following equation.

$$w_t = w \cdot a \cdot c \qquad \text{Eq. 1}$$

In Equation 1, $w_t$ represents the total number of worker subnets to be provisioned in the service as a whole.

In another step, the algorithm may calculate a total number of load balancer subnets to be provisioned. The total number of load balancer subnets may be calculated based on the total number of clusters 302 and the total number of load balancers per cluster 308. For example, the total number of load balancer subnets may be calculated using following equation.

$$b_t = b \cdot c \qquad \text{Eq. 2}$$

In Equation 2, $b_t$ represents the total number of load balancer subnets to be provisioned in the service as a whole.

In another step, the algorithm may calculate a total number of subnets to be provisioned in the project. The total number of subnets may be calculated based on the total number of worker subnets and the total number of load balancer subnets. For example, the total number of subnets may be calculated using the following equation.

$$s = w_t + b_t \qquad \text{Eq. 3}$$

In equation 3, s represents the total number of subnets to be assigned in the service as a whole.

Next, the algorithm may calculate a level at which the top level network address should be sliced. As described above in relation to FIG. 2, the level may correspond to a base-2 exponential that determines the number of subnet addresses derived from the top level network address. In some embodiments, the base-2 raised to an exponent corresponding to the calculated number of slicing levels may be greater than or equal to the total number of subnets to be assigned in the service (e.g., $2^{\wedge}$(number of subnet levels)). To determine the level, the base-2 logarithm may be calculated for the total number of subnets, and the result of the base-2 logarithm can then be subjected to a ceiling operation (e.g., rounding to the next-highest integer) to determine the level. For example, one specific embodiment may use the following equations to determine the level number.

$$2^n \geq w_t + b_t \qquad \text{Eq. 4}$$

$$\log_2(2^n) \geq \log_2(w \cdot a \cdot c + b \cdot c) \qquad \text{Eq. 5}$$

$$n \geq \log_2(c(w \cdot a + b)) \qquad \text{Eq. 6}$$

$$n \geq \log_2(c) + \log_2(w \cdot a + b) \qquad \text{Eq. 7}$$

Since $n \in N$, the ceiling operation can be applied to Equation 7 to calculate the final level n for the slicing operation.

$$n \geq \lceil \log_2(c) + \log_2(w \cdot a + b) \rceil \qquad \text{Eq. 8}$$

The level number n may now be used to perform the slicing operation on the top level network address. In some embodiments, the algorithm may manually calculate the proper IP address for each subnet by dividing the network address into $2^n$ non-overlapping subnets. Depending on the particular IaC tool used for defining the architecture, predefined functions may exist that perform this operation automatically. For example, the Terraform tool provides the cidrsubnet (prefix, newbits, netnum) function that can be used to perform this mathematical operation for each subnet. In this function, the following inputs may be used.

prefix is a predetermined value derived from the top-level network address.

netnum is a value $\in [0, 2^n - 1]$ representing the index of a single one of the subnet addresses at the n level from FIG. 2.

newbits is the dynamically calculated value of n representing the minimum value that ensures that there are enough CIDR blocks to be assigned to each subnet.

At this stage, the available subnets can be assigned to each of the resources described in the architecture of FIG. 1. In the Terraform tool, this can be accomplished using a single count meta-argument for a resource. For example, by inserting the count=num_worker_subnets line after the declaration of the resource in the Terraform code, the resource can be duplicated once for each worker subnet. It should be emphasized that IaC languages and tools typically provide limited looping mechanisms that only allow a single level of resources to be duplicated.

However, in practice, it is useful to also generate and/or assign labels to each of the resources based on a combination of various variables. For example, some embodiments may label each subnet according to a combination of its cluster and availability domain. When dealing with multiple variables that need to be iterated through in order to generate labels for each resource, multiple looping levels may be necessary. However, as described above, IaC languages do not provide such nested looping structural controls as native features of the languages. Therefore, in order to assign labels based on multiple variables (e.g., clusters, availability domains, etc.) each such label had to be calculated by hand and hardcoded into the script. As described above, hard coding values into the script limits the reusability and scalability of the design and requires human intervention any time the design is altered.

The embodiments described herein solve this problem by collecting the various label components together into vectors of labels and performing modular arithmetic to generate a Cartesian product. The Cartesian product may then use the single-loop feature that is imitated by the count meta-argument in the Terraform tool.

Figure 4:
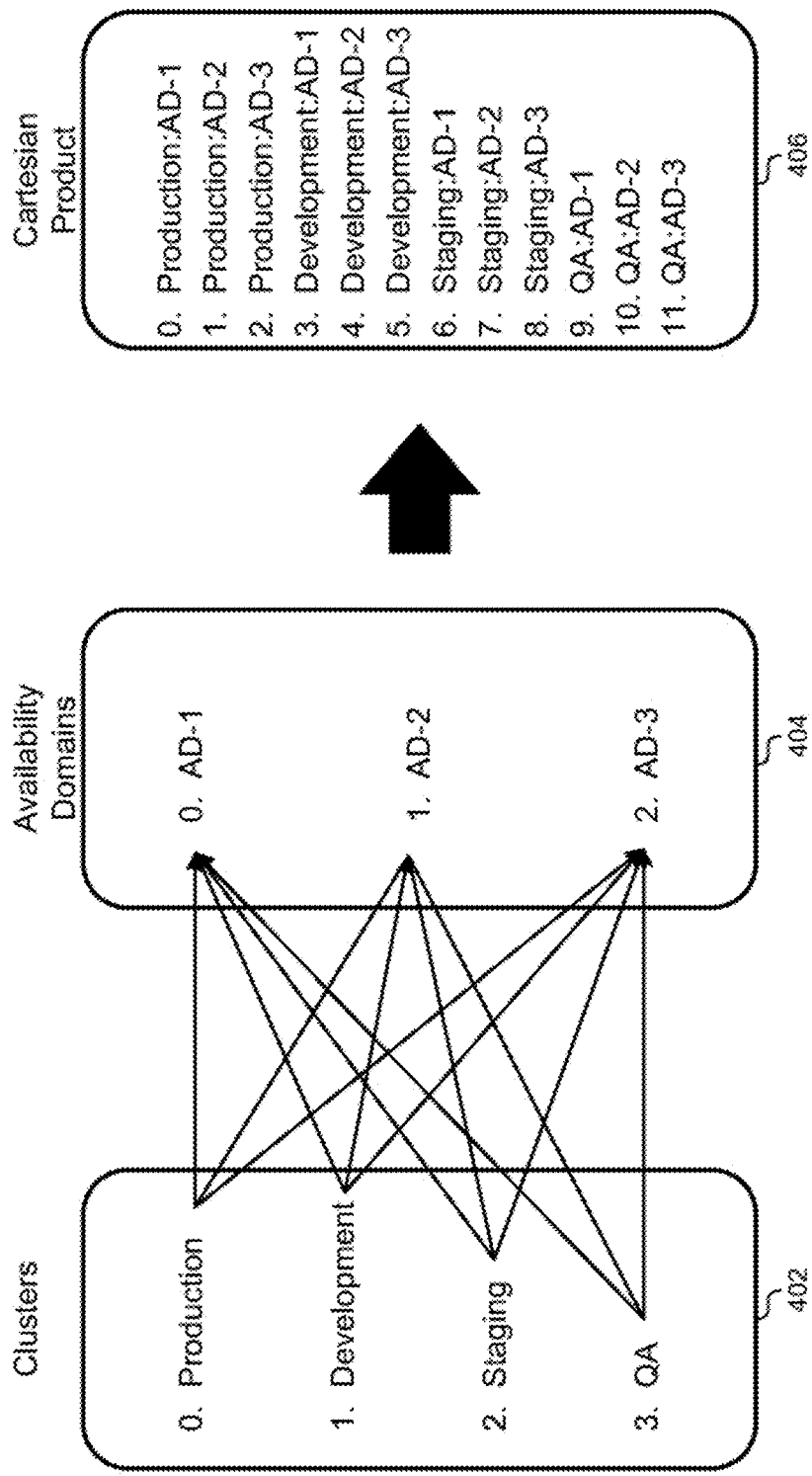
FIG. 4 illustrates how a Cartesian product can be used to form a single list of labels from a plurality of different variables, according to some embodiments.

FIG. 4 illustrates how a Cartesian product can be used to form a single list of labels from a plurality of different variables, according to some embodiments. A first vector comprising a list of cluster labels 402 may include clusters referenced as production, development, staging, quality assurance, and so forth. A second vector comprising a list of availability domains 404 may include domains referenced by a numerical identifier (e.g., AD-1, AD-2, etc.). Previously, a script could statically define all the pairs formed by combinations of these two vectors of labels into a hardcoded single label vector that could then be applied to each of the subnets. However, this limited the reusability of the script. This was necessary because while traditional programming languages provide nested loops such that the clusters 402 could be iterated in an outer loop and the availability domains 404 could be iterated in an inner loop, IaC tools typically do not provide such control structures.

Some embodiments approximate the nested-loop control structure by using modular arithmetic as illustrated in FIG. 4. This allows the script to receive any number of clusters, availability domains, or other labels as an input, then dynamically generate a single vector of labels 406 that can be applied using the count meta-argument in the Terraform tool. Using the algorithm described below, a Cartesian product may be generated such that it includes a set of all ordered pairs for each of the two input label vectors. It should be emphasized that two vectors of labels are used here only as an example. Other embodiments may use more than two vector labels, and a Cartesian product may be calculated for each combination of labels to form a single label vector that may be applied without nested looping.

In FIG. 4, the Cartesian product has generated a vector of labels 406 that comprises each of the unique pairings of labels from the clusters 402 and the availability domains 404. FIG. 5 illustrates how the Cartesian product can be calculated using modular arithmetic, according to some embodiments. In this example, the Cartesian product is represented as a grid with two-dimensional coordinates. The two-dimensional coordinates represent the indices that would be used in a nested loop. For example, the production cluster would loop with an index of 0, the development cluster within loop at an index of 1, the staging cluster would loop with an index of 2, and so forth. For the inner loop, each of the availability domains would loop with an index that incremented from 0 to 2.

However, instead of using this nested looping process, each resulting pair from the Cartesian product can be indexed using a single index in the result vector of labels 406 illustrated in FIG. 4. The single index is related to the nested indices using modular arithmetic. For example, the index in the outer loop representing cluster labels is related to the index by the following equation.

$$\text{index}_c = \frac{\text{index}}{a} \qquad \text{Eq. 9}$$

The variable a corresponds to the number of values in the input vector, which in this case is 3, and $\text{index}_c$ corresponds to the cluster index. Similarly, the index of the inner loop representing availability domain labels may be related to the index by the following equation.

$$\text{index}_{ad} = \text{index} \bmod a \qquad \text{Eq. 10}$$

The $\text{index}_{ad}$ corresponds to the availability domain index.

FIGS. 6A-6E illustrate a detailed example of a Terraform script that implements the algorithms described above. This flowchart and the pseudocode is provided by way of example and is not meant to be limiting. The algorithms described above may be implement sitting any IaC language using this disclosure.

Figure 6A:
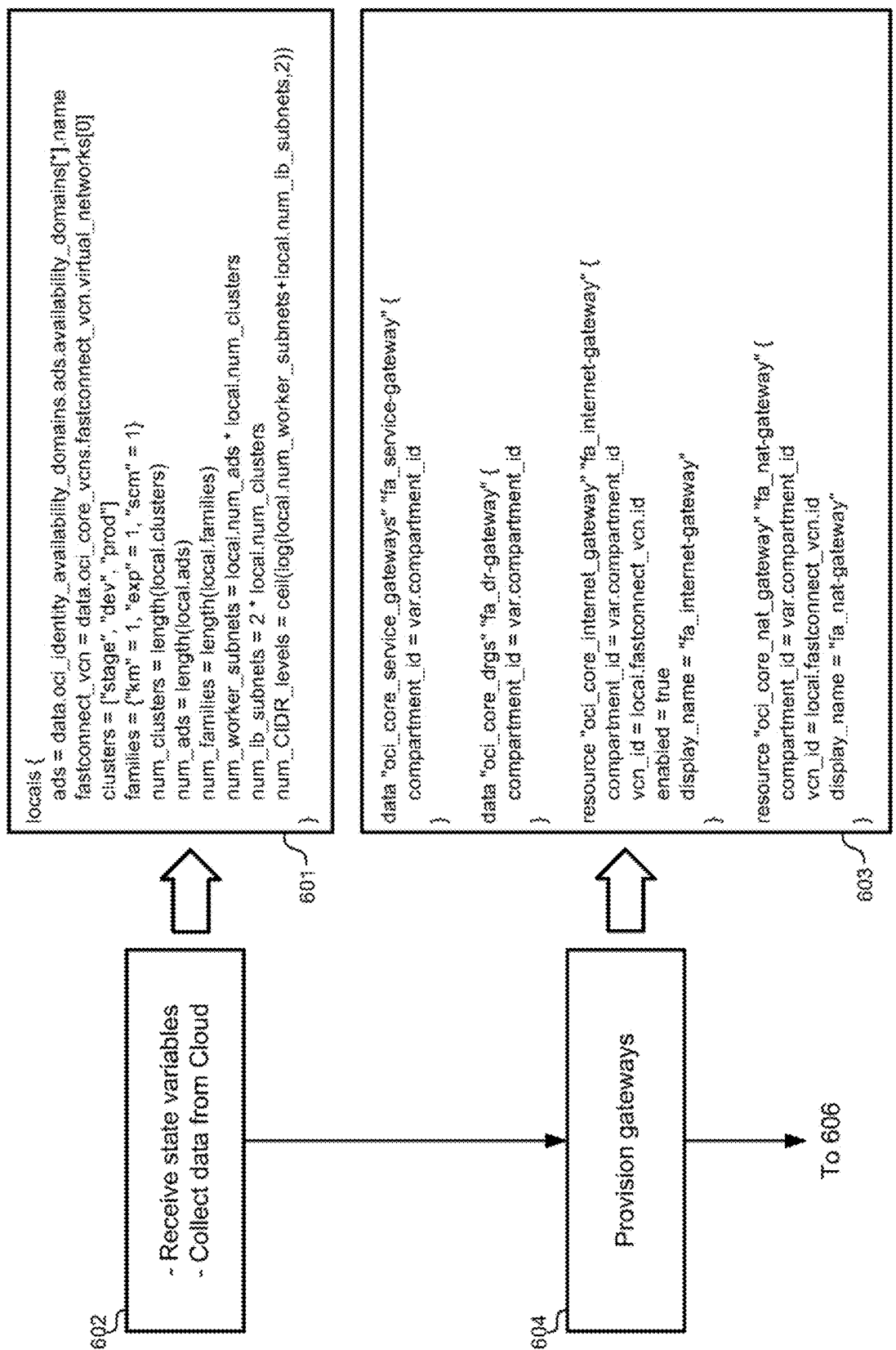
FIG. 6A illustrates a first portion of a flowchart of a method for provisioning a service in a cloud infrastructure with accompanying pseudocode, according to some embodiments.

FIG. 6A illustrates a first portion of a flowchart of a method for provisioning a service in a cloud infrastructure with accompanying pseudocode, according to some embodiments. The method may include receiving state variables and collecting data from the cloud infrastructure (602). As described above, some embodiments may receive each of the variables defining the resources to be provisioned as inputs to the script. In this example, this includes a number of availability domains, a number of worker subnets in each domain, a number of load balancer subnets for each cluster, and so forth. The number of worker subnets per availability domain may be assumed to be 1 in this example, and the number of load balancer subnets per cluster may be assumed to be 2. Pseudocode 601 for receiving these values may include assigning each of these values to a variable. The pseudocode 601 also uses the FastConnect utility, which is a network connectivity alternative to using the public Internet for connecting to a cloud infrastructure and other online services.

The pseudocode 601 also includes an implementation of the algorithm described above for defining a number of CIDR levels. For example, Equation 8 above is implemented in the last line of the pseudocode 601:
num_CIDR_levels=ceil(log(local.num_worker_subnets+local.num_lb_subnets,2)).
This line of pseudocode calculates the total number of subnets required for load balancers and worker nodes. This total is provided as an input to a base-2 log function, the results of which are provided to a ceiling function to determine the minimum number of CIDR levels for the service.

The method may also include provisioning gateways for the service (604). The pseudocode 603 illustrates examples of how to define service gateways, Internet gateways, NAT gateways, and so forth. As described above, the syntax of the pseudocode 603 may be specific to the Terraform tool, and may thus be changed when working with other tools.

Figure 6B:
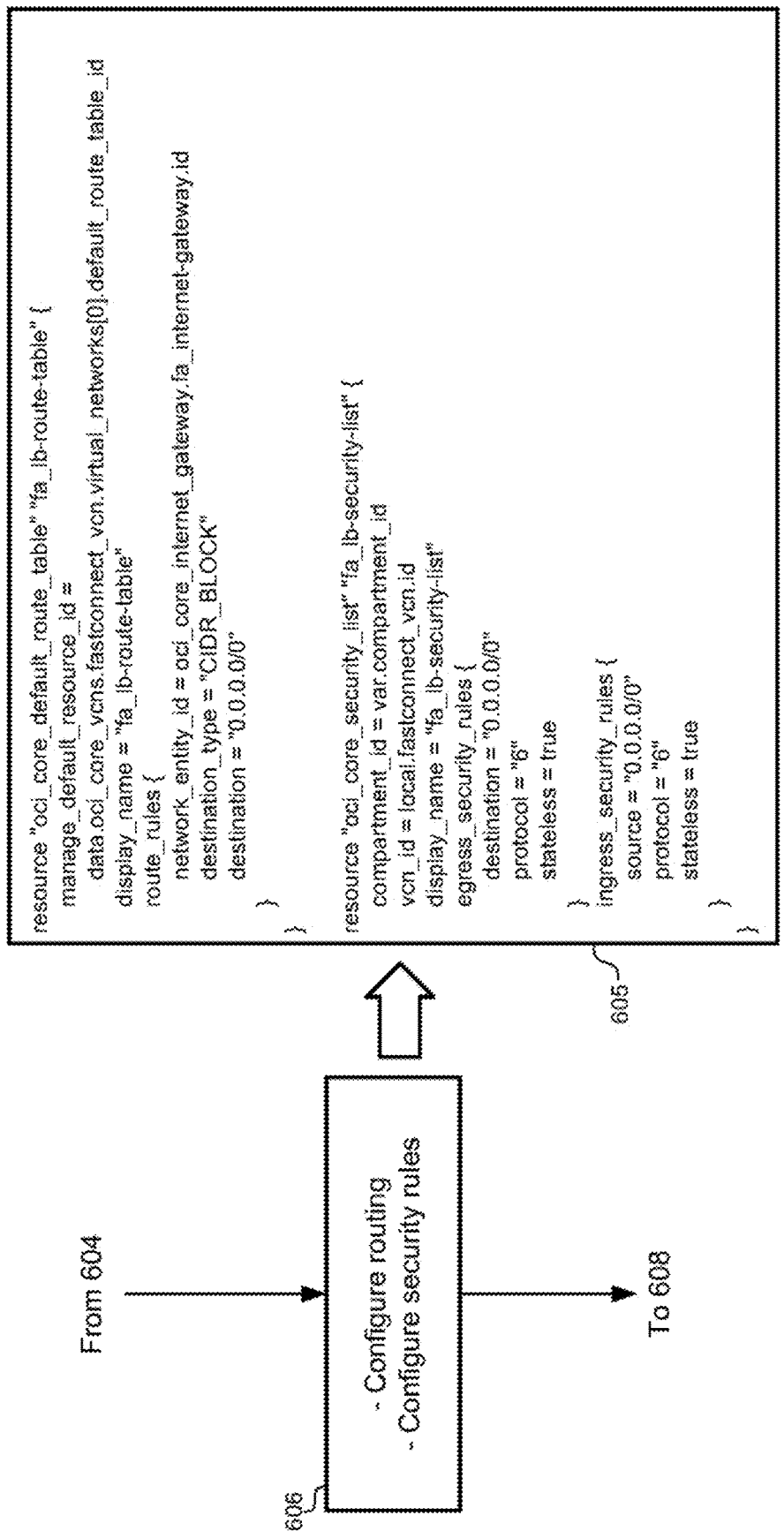
FIG. 6B continues the flowchart for the method of provisioning a service in a cloud infrastructure, according to some embodiments.

FIG. 6B continues the flowchart for the method of provisioning a service in a cloud infrastructure, according to some embodiments. The method may additionally include configuring the routing tables and security rules for the service (606). The pseudocode 605 illustrates examples for declaring a default routing table and a load balancer security list. Note that a number of additional security and/or routing resources may be declared in real-world projects. The examples provided in the pseudocode 605 are merely representative and may be used as a template for generating other security rules, security lists, and routing tables for different aspects of a service.

Figure 6C:
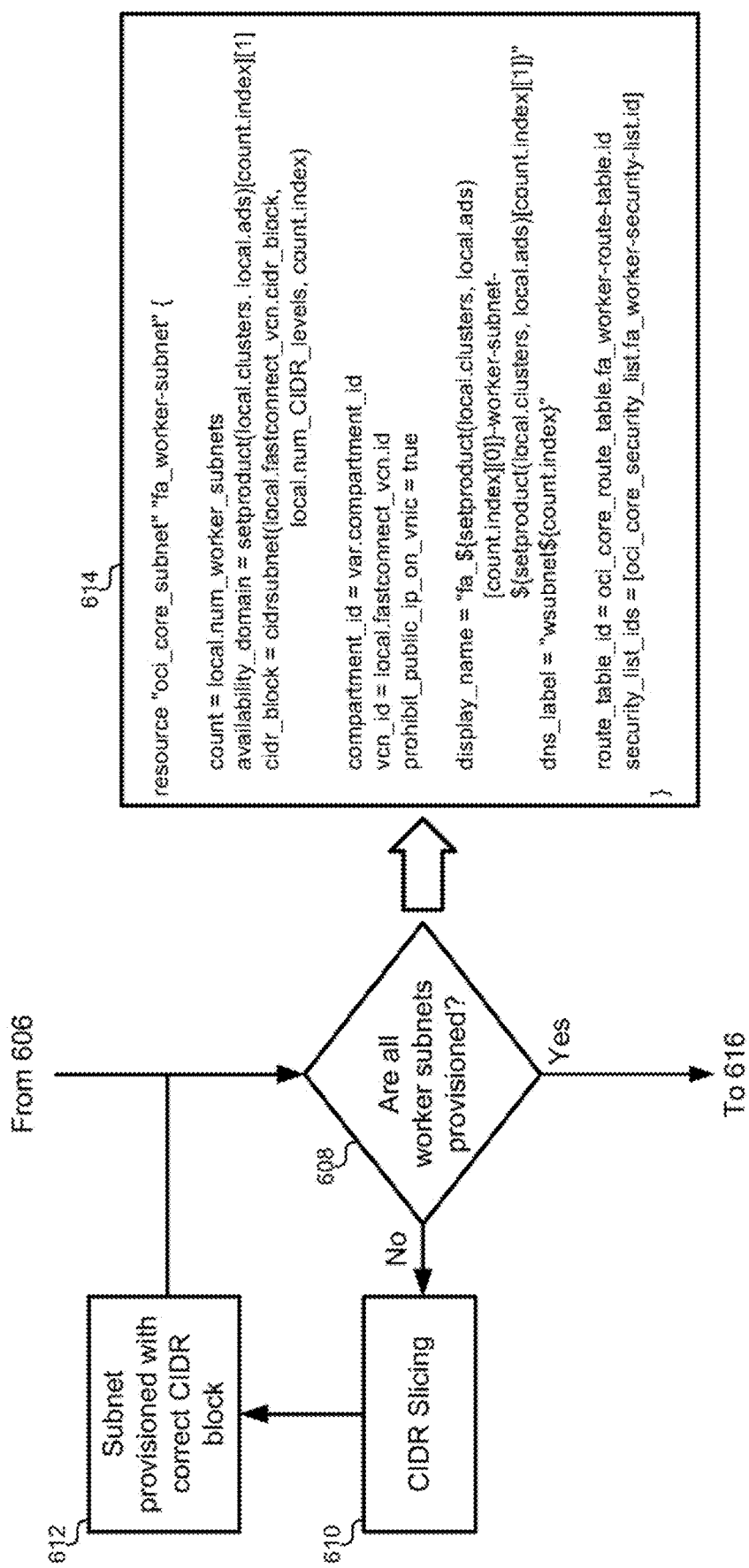
FIG. 6C continues the flowchart of the method for provisioning a service in a cloud infrastructure, according to some embodiments.

FIG. 6C continues the flowchart of the method for provisioning a service in a cloud infrastructure, according to some embodiments. The method may additionally include determining whether all worker subnets have been provisioned (608). If there are remaining worker subnets to be provisioned, then the method may include calculating the subnet address using the CIDR slicing algorithm described above (610). Each of the subnets may then be provisioned with the corresponding CIDR block (612). This cycle may be repeated for each of the worker subnets.

As is evident in the pseudocode 614, the loop construct illustrated in the flowchart cannot be implement sitting in the Terraform pseudocode. Instead, the code provides a meta-argument that duplicates the resource a defined number of times. For example, the first line of pseudocode after the resource declaration includes the following:

count=local.num_worker_subnets.

By assigning the number of worker subnets to the count variable, the pseudocode 614 can instruct the Terraform tool to generate the oci_core_subnet resource for each worker subnet. The pseudocode 614 then uses the cidrsubnet( ) described above with the count.index variable used to index each of the subnets at the specified level calculated above.

The pseudocode 614 also implements the nested loop algorithm described above by calculating a Cartesian product between the cluster names and the availability domain names. These are stored in the availability domain array that is indexed by the count. index variable. For example, the following command generates an array of labels for each of the subnets:

availability domain=setproduct(local.clusters, local.ads)
[count.index][1].

Instead of executing a traditional nested loop, this Cartesian product generates the list of labels for the subnets. Finally, the labels can be assigned to the corresponding subnets using the modular arithmetic illustrated in the pseudocode 614 and described in detail above.

The process illustrated in FIG. 6C may be carried out to assign each of the worker subnets in the project. Although not illustrated specifically, the process illustrated in FIG. 6C may be repeated for each of the load balancer subnets. For example, a similar procedure may be followed to slice the top level network address based on the level calculated above, and the list of labels may be generated using a Cartesian product. However, the netnum parameter for the cidrsubnet( ) function may be shifted such that the load balancer subnets are assigned to CIDR blocks after the worker subnets.

Figure 6D:
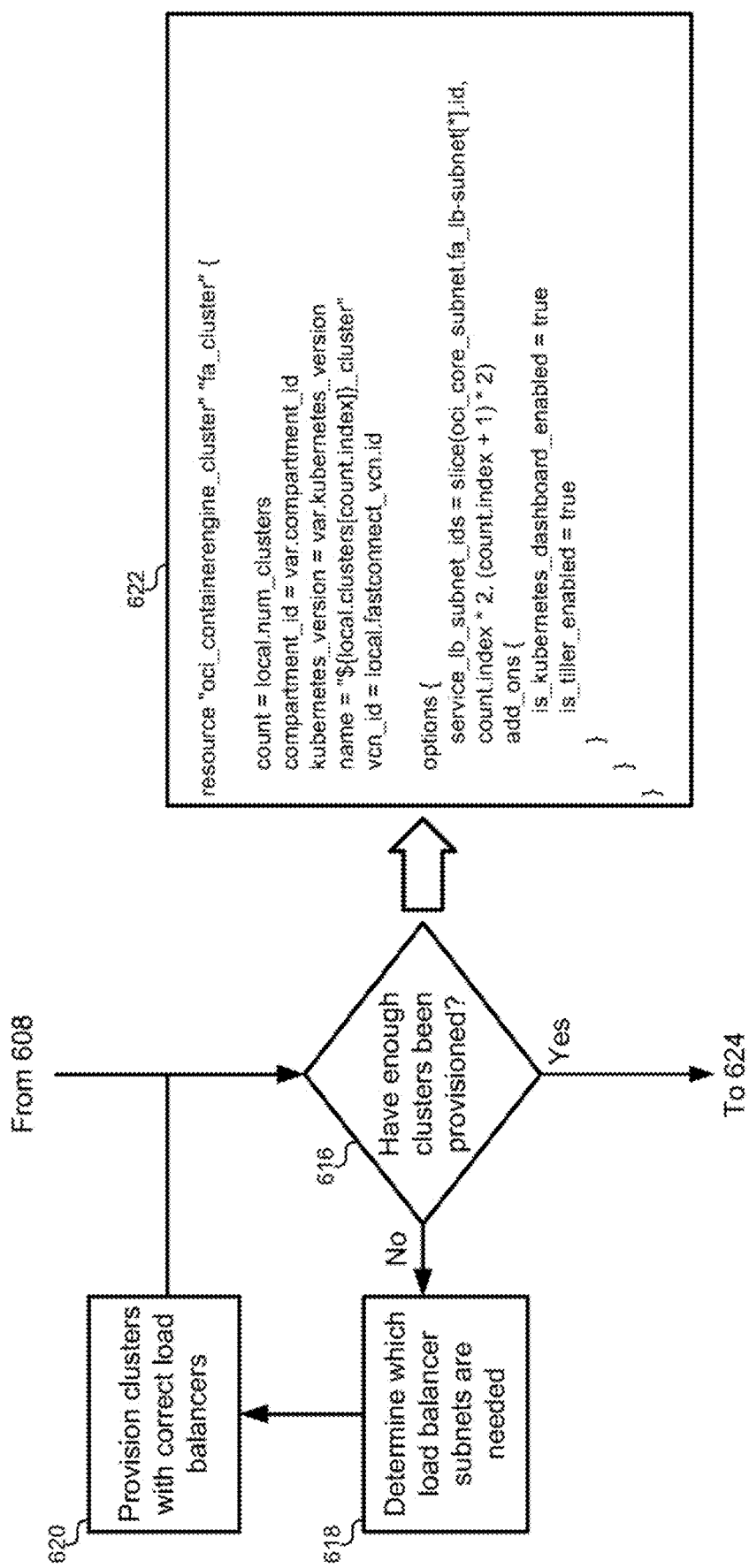
FIG. 6D continues the flowchart of the method for provisioning a service in a cloud infrastructure, according to some embodiments.

FIG. 6D continues the flowchart of the method for provisioning a service in a cloud infrastructure, according to some embodiments. The method may further include determining whether enough clusters have been provisioned based on the number of clusters described above (616). If clusters remain to be provisioned, the method may determine which load balancer subnets are needed (618), and provision clusters with the correct load balancers (620). As described above, this loop procedure may be modeled in the pseudocode 622 using the count variable to dynamically generate the specified number of clusters. The second portion of the pseudocode 622 may assign load balancer subnets to each of the clusters.

Figure 6E:
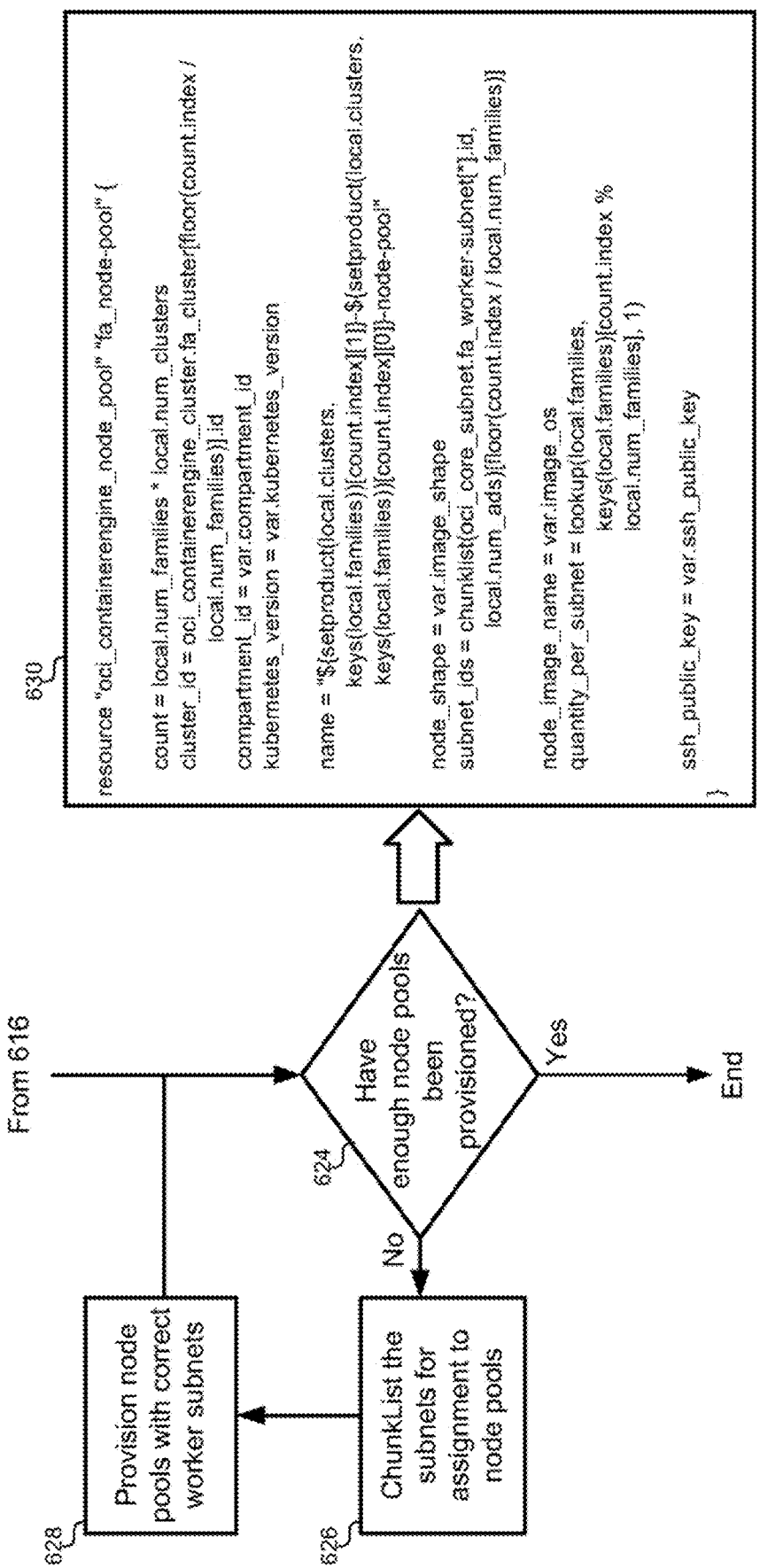
FIG. 6E completes the flowchart of the method for provisioning a service in a cloud infrastructure, according to some embodiments.

FIG. 6E completes the flowchart of the method for provisioning a service in a cloud infrastructure, according to some embodiments. The method may also include determining whether enough node pools have been provisioned (624). As long as additional node pools need to be provisioned, the method may include using a ChunkList operation to divide the subnets for assignment into node pools (626). In the pseudocode 630, the ChunkList function from the Terraform tool can be used to split a single list into fixed-sized chunks, thus returning a list of lists. The method may then include provisioning node pools with the corresponding worker subnets (628). In the pseudocode 630, each node pool has a specified quantity of nodes per subnet described in the families map.

Figure 7:
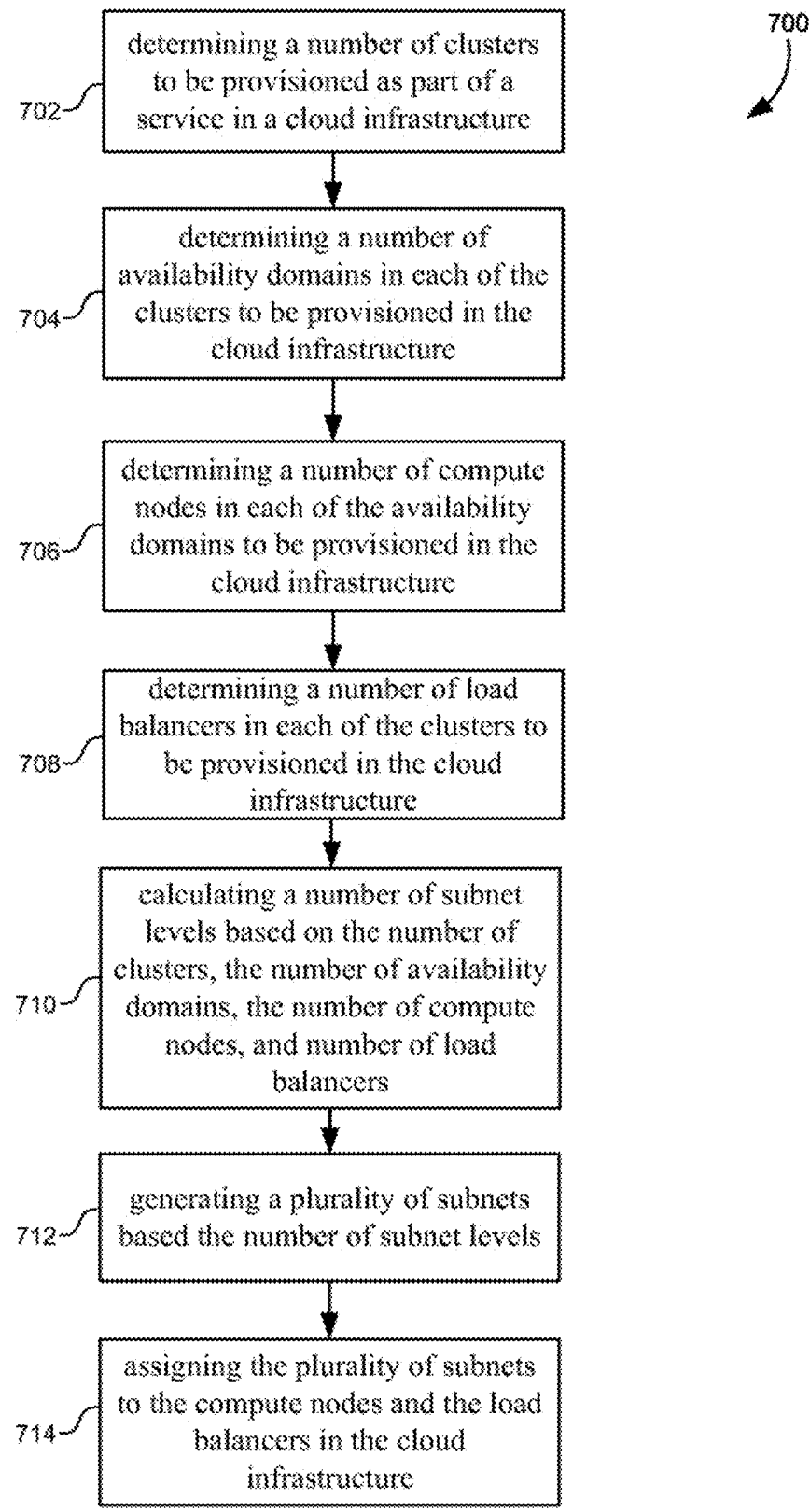
FIG. 7 illustrates a flowchart of a method for provisioning a variable number of subnets with corresponding labels at runtime that may be implemented in any IaC language, according to some embodiments.

Although the flowchart and description above are specific to the Terraform tool, the algorithms for generating and assigning CIDR subnets and simulating nested loops for applying labels to subnets may be implemented in any IaC language. FIG. 7 illustrates a flowchart of a method for provisioning a variable number of subnets with corresponding labels at runtime that may be implemented in any IaC language, according to some embodiments. The method may include determining a number of clusters to be provisioned as part of a service in a cloud infrastructure (702). The method may also include determining a number of availability domains in each of the clusters (704), determining a number of compute nodes in each of the availability domains (706), and/or determining a number of load balancers in each of the clusters (708). In each of these steps, these values may be determined by virtue of being received as an input to the script, by being stored as a constant in the script, and/or being determined by calculations or functions in the script. For example, each value may be derived or looked up based on a predetermined configuration selected by a user. In some embodiments, these values may be determined as described above in relation to FIGS. 3A-3B or shown in FIG. 6A.

The method may also include calculating a number of subnet levels based on the number of clusters, the number of availability domains, the number of compute nodes, and the number of load balancers (710). The compute nodes may correspond to the worker subnets described above. Each of the load balancers may also be described as a load balancer subnet. The number of subnet levels may be calculated as described above in relation to Equations 2-8 and in relations to FIG. 6C. The method may further include generating a plurality of subnets based on the number of subnet levels (712). This step may be executed using the cidrsubnet function described above. Alternatively or additionally, this step may be executed by mathematically subdividing the top level network address based on $2^n$ subdivisions. The method may also include assigning the plurality of subnets to compute nodes and the load balancers in the cloud infrastructure (714). As described above, each of the worker subnets and the load balancer subnets may be assigned a label based on the Cartesian product and modular arithmetic algorithm described above.

It should be appreciated that the specific steps illustrated in FIG. 7 provide particular methods of provisioning a variable number of subnets with corresponding labels at runtime according to various embodiments. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
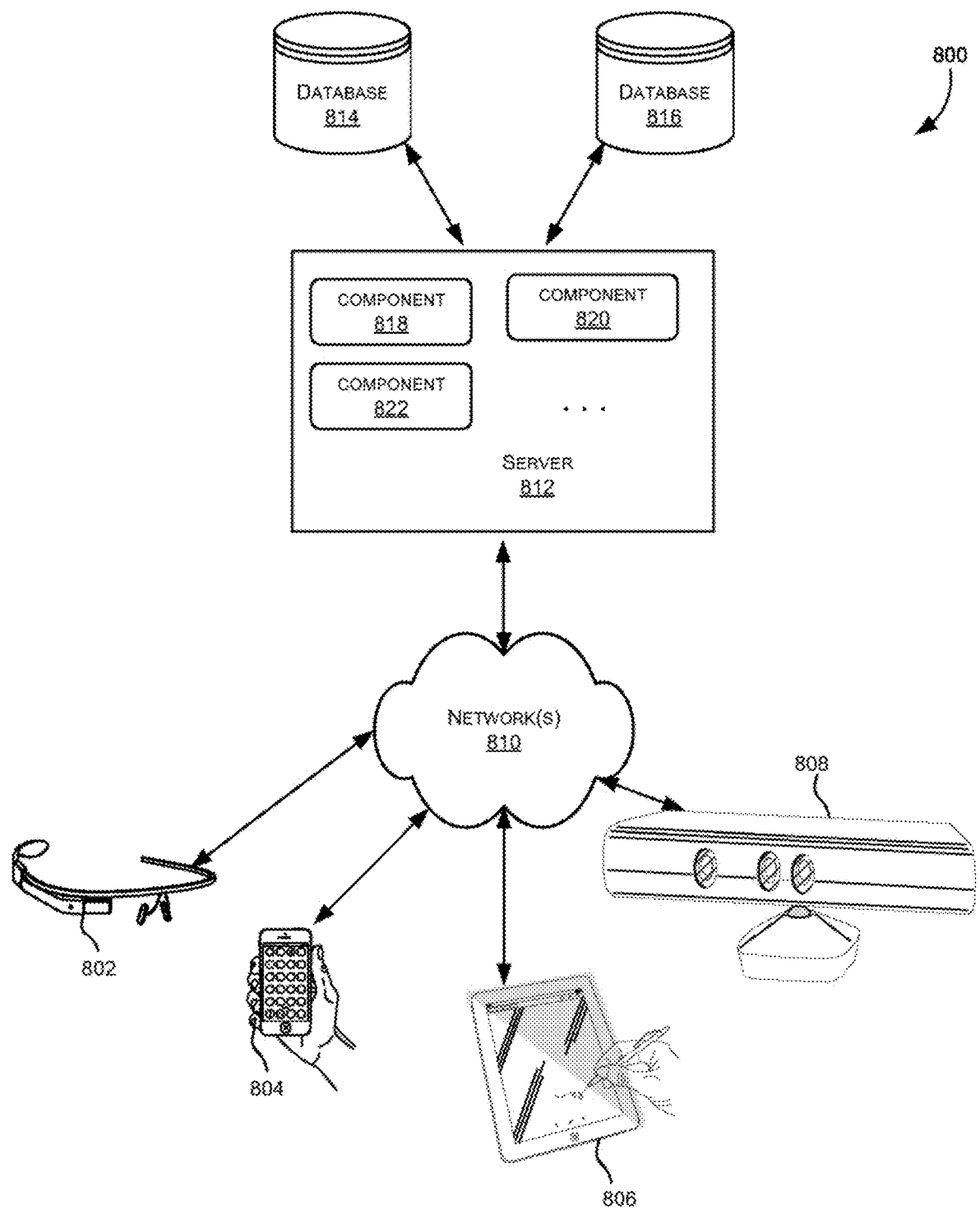
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
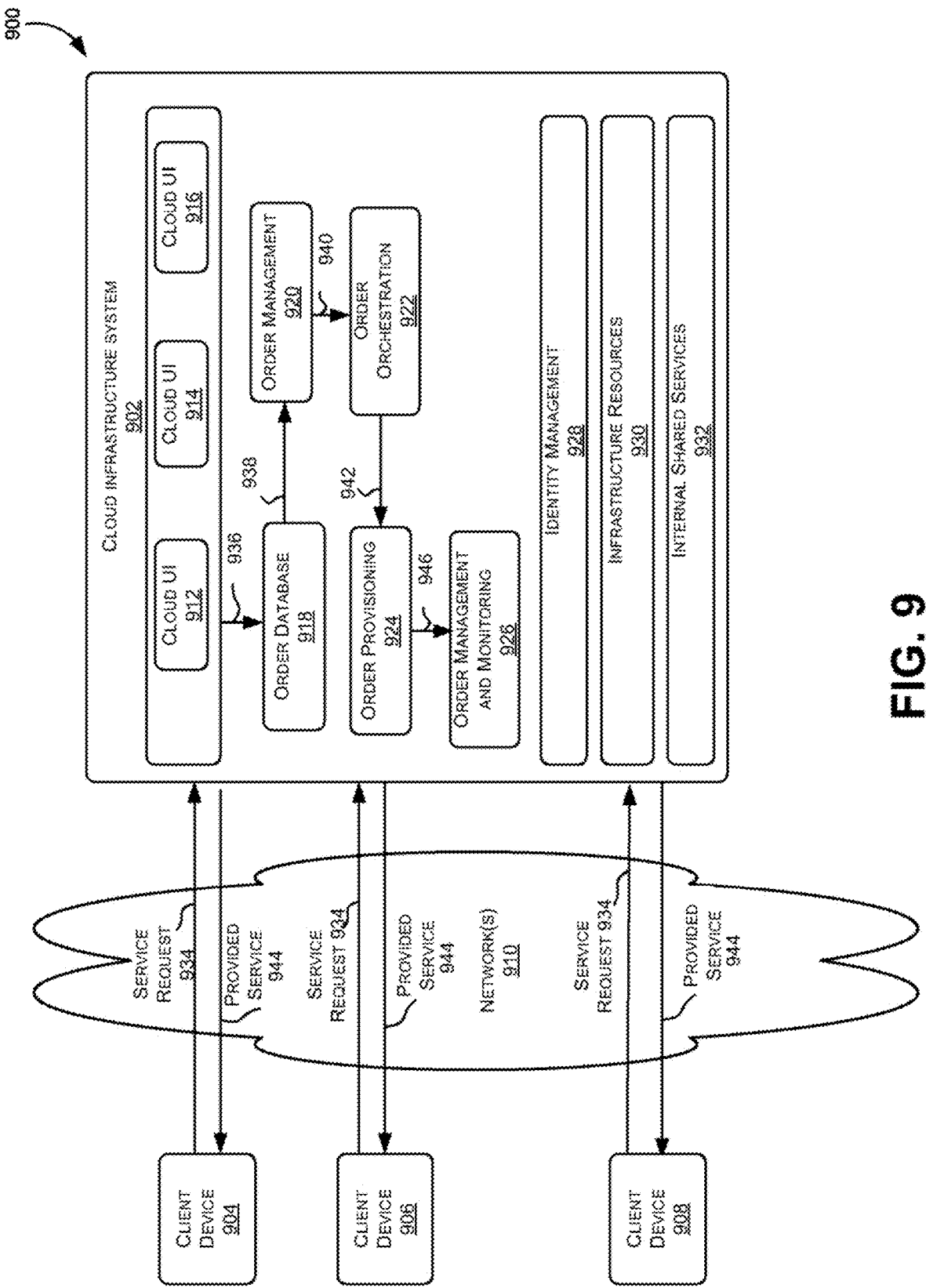
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
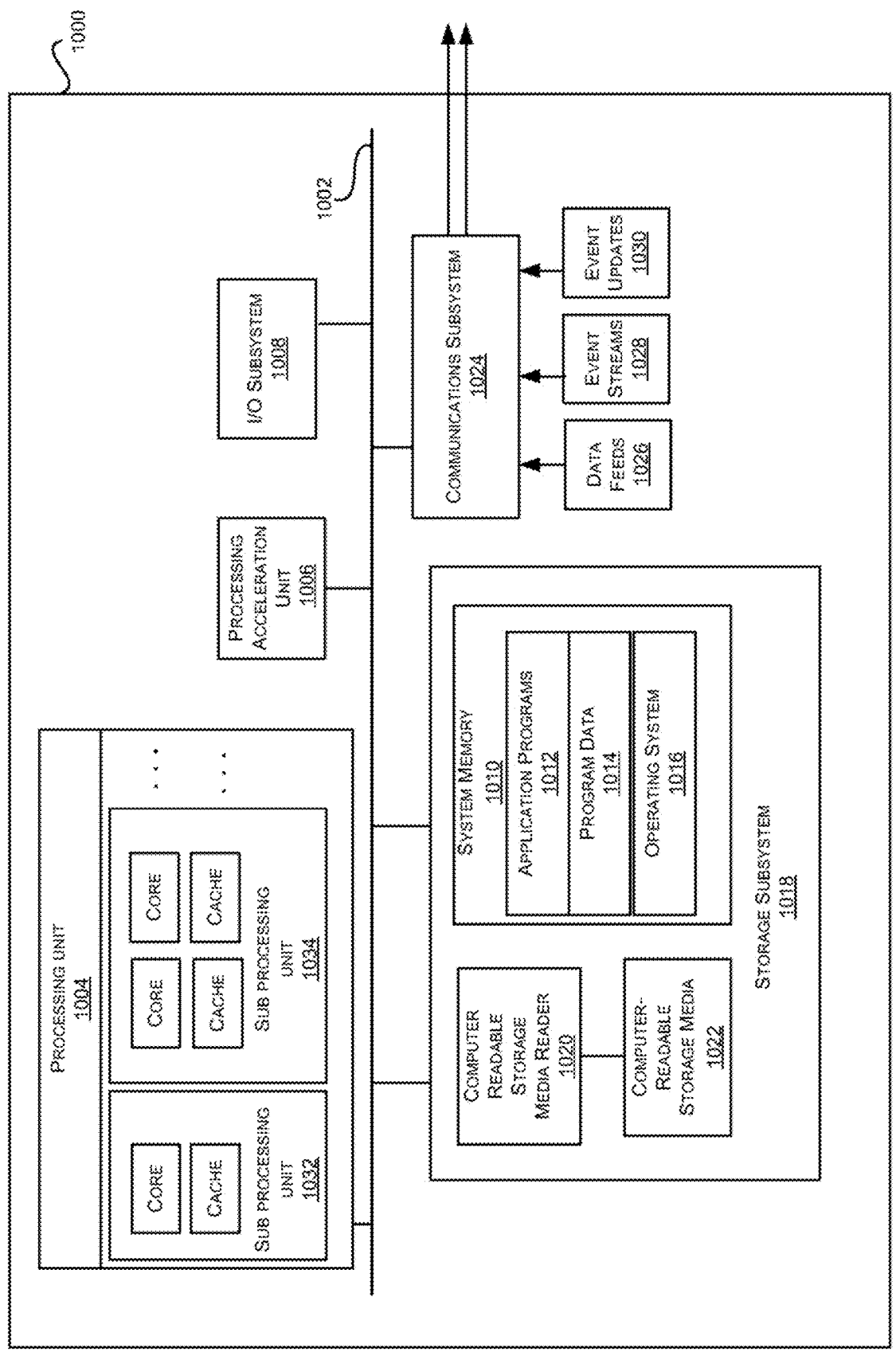
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, causes the one or more processors to perform operations comprising:
   executing a provisioning script in an Infrastructure as Code (IaC) programming language, wherein the script initially executes before a service in a cloud infrastructure is provisioned as a result of the script, and the script executes by:
      determining, at a runtime of the script, a number of clusters to be provisioned as part of the service in the cloud infrastructure;
      determining, at the runtime of the script, a number of availability domains in each of the clusters to be provisioned in the cloud infrastructure;
      determining, at the runtime of the script, a number of compute nodes in each of the availability domains to be provisioned in the cloud infrastructure;
      determining, at the runtime of the script, a number of load balancers in each of the clusters to be provisioned in the cloud infrastructure;
      calculating, at the runtime of the script, a number of subnet levels based on the number of clusters, the number of availability domains, the number of compute nodes, and the number of load balancers;
      generating, at the runtime of the script, a plurality of subnets based on the number of subnet levels; and
      assigning, at the runtime of the script, the plurality of subnets to the compute nodes and the load balancers in the cloud infrastructure.

2. The non-transitory computer-readable medium of claim 1, wherein the operations further comprise causing each of the compute nodes and each of the load balancers to be provisioned in the cloud infrastructure with the plurality of subnets.

3. The non-transitory computer-readable medium of claim 1, wherein the operations further comprise:
   receiving a change to the number of availability domains, the number of clusters, the number of compute nodes, or the number of load balancers;
   recalculating the number of subnet levels based on the change;
   regenerating the plurality of subnets based on the number of subnet levels.

4. The non-transitory computer-readable medium of claim 1, wherein the operations further comprise:
   determining a second number of clusters, a second number of availability domains, a second number of compute nodes, and a second number of load balancers to be provisioned as part of a second service in the cloud infrastructure, wherein the second service is different than the service;
   calculating a second number of subnet levels based on the second number of clusters, the second number of availability domains, the second number of compute nodes, and the second number of load balancers, herein the second number of subnet levels is different from the number of subnet levels; and
   generating a second plurality of subnets based on the second number of subnet levels.

5. The non-transitory computer-readable medium of claim 1, wherein the number of the plurality of subnets is equal to a base 2^(number of subnet levels).

6. The non-transitory computer-readable medium of claim 1, wherein determining the number of availability domains comprises:
   receiving a selection of a configuration from a plurality of predetermined configurations for the service; and
   determining a service level agreement (SLA) for the configuration, wherein the SLA defines the number of availability domains.

7. The non-transitory computer-readable medium of claim 1, wherein determining the number of availability domains comprises:
   receiving the number of availability domains as a runtime input as the instructions are executed by the one or more processors.

8. The non-transitory computer-readable medium of claim 1, wherein an availability domain in the availability domains comprises at least one of the compute nodes and at least one of the load balancers.

9. The non-transitory computer-readable medium of claim 1, wherein generating the plurality of subnets based on the number of subnet levels comprises:
   executing a function that performs a classless inter-domain routing (CIDR) slice of a top-level network address.

10. The non-transitory computer-readable medium of claim 9, wherein the function accepts the number of subnet levels as a parameter such that the number of subnet levels can be calculated at runtime.

11. The non-transitory computer-readable medium of claim 1, wherein the operations further comprise assigning a plurality of labels to each of the plurality of subnets.

12. The non-transitory computer-readable medium of claim 11, wherein the plurality of labels are based on combinations of the availability domains and the clusters.

13. The non-transitory computer-readable medium of claim 12, wherein the operations further comprise generating the combinations of the availability domains and the clusters by calculating a Cartesian product.

14. The non-transitory computer-readable medium of claim 13, wherein calculating the Cartesian product comprises generating a vector cross-product between the availability domains and the clusters.

15. The non-transitory computer-readable medium of claim 14, wherein an index in the plurality of labels is related to an index in the clusters by dividing the index in the plurality of labels by the number of clusters.

16. The non-transitory computer-readable medium of claim 14, wherein an index in the plurality of labels is related to an index in the availability domains by performing a modular division the index in the plurality of labels by the number of availability domains.

17. The non-transitory computer-readable medium of claim 12, wherein the plurality of labels includes an index that is modified by a counter that is incremented each time a compute node or load balancer is declared.

18. The non-transitory computer-readable medium of claim 12, wherein the plurality of labels are generated without using a nested loop structure.

19. A system comprising:
one or more processors; and
one or more memory devices comprising instructions that, when executed by the one or more processors, cause the one or more processors to perform operations comprising:
executing a provisioning script in an Infrastructure as Code (IaC) programming language, wherein the script initially executes before a service in a cloud infrastructure is provisioned as a result of the script, and the script executes by:
determining, at a runtime of the script, a number of clusters to be provisioned as part of the service in the cloud infrastructure;
determining, at the runtime of the script, a number of availability domains in each of the clusters to be provisioned in the cloud infrastructure;
determining, at the runtime of the script, a number of compute nodes in each of the availability domains to be provisioned in the cloud infrastructure;
determining, at the runtime of the script, a number of load balancers in each of the clusters to be provisioned in the cloud infrastructure;
calculating, at the runtime of the script, a number of subnet levels based on the number of clusters, the number of availability domains, the number of compute nodes, and the number of load balancers;
generating, at the runtime of the script, a plurality of subnets based on the number of subnet levels; and
assigning, at the runtime of the script, the plurality of subnets to the compute nodes and the load balancers in the cloud infrastructure.

20. A method for executing a provisioning script with runtime-adjustment numbers of resource declarations, the method comprising:
executing a provisioning script in an Infrastructure as Code (IaC) programming language, wherein the script initially executes before a service in a cloud infrastructure is provisioned as a result of the script, and the script executes by:
determining, at a runtime of the script, a number of clusters to be provisioned as part of the service in the cloud infrastructure;
determining, at the runtime of the script, a number of availability domains in each of the clusters to be provisioned in the cloud infrastructure;
determining, at the runtime of the script, a number of compute nodes in each of the availability domains to be provisioned in the cloud infrastructure;
determining, at the runtime of the script, a number of load balancers in each of the clusters to be provisioned in the cloud infrastructure;
calculating, at the runtime of the script, a number of subnet levels based on the number of clusters, the number of availability domains, the number of compute nodes, and the number of load balancers;
generating, at the runtime of the script, a plurality of subnets based on the number of subnet levels; and
assigning, at the runtime of the script, the plurality of subnets to the compute nodes and the load balancers in the cloud infrastructure.

\* \* \* \* \*